May 2, 1950 A. EDELMAN 2,506,143
CIRCUITS FOR ELECTRONIC TYPE INDICATING SYSTEMS
Filed Oct. 6, 1944 3 Sheets-Sheet 1

INVENTOR.
ABRAHAM EDELMAN
BY
John C. Kerr
ATTORNEY

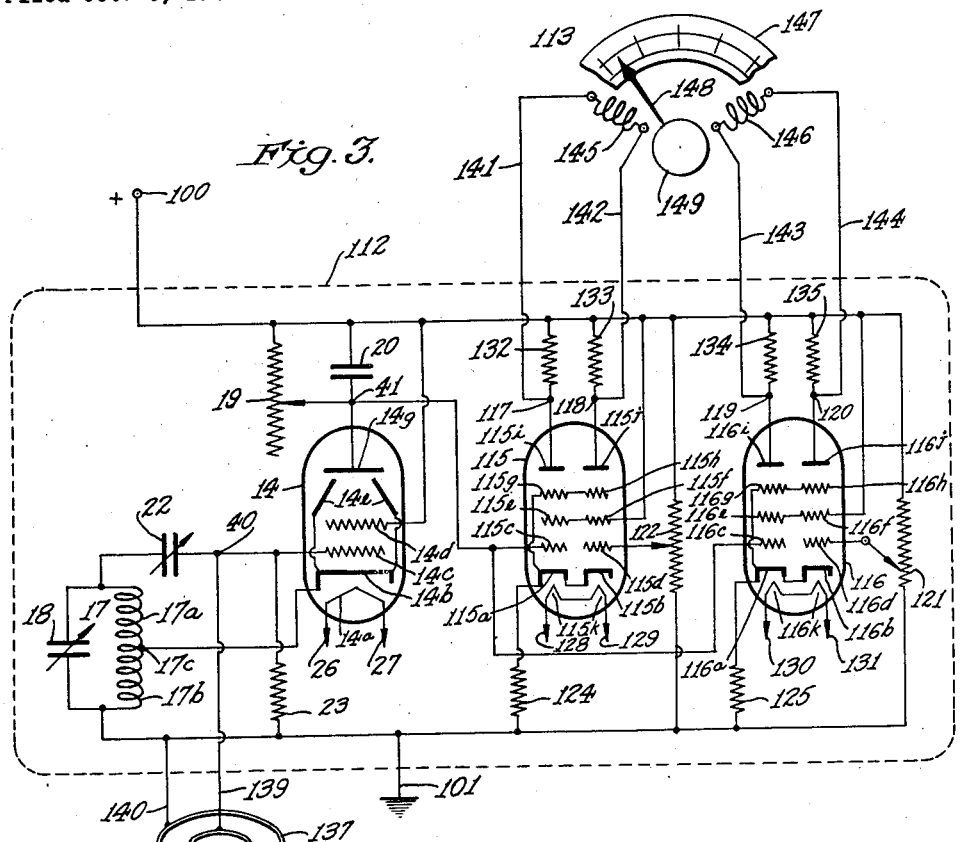

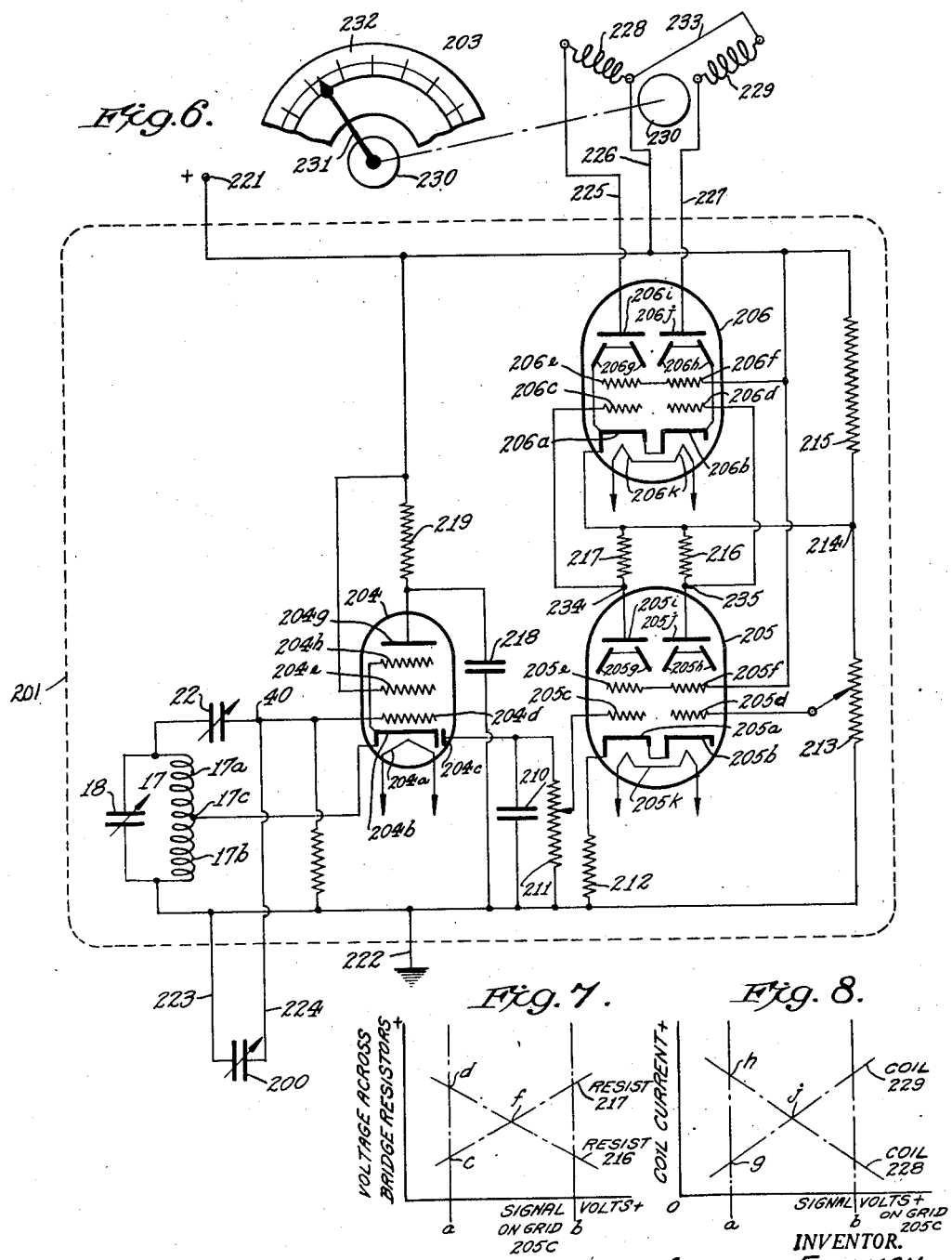

Patented May 2, 1950

2,506,143

UNITED STATES PATENT OFFICE 2,506,143

CIRCUITS FOR ELECTRONIC TYPE INDICATING SYSTEMS

Abraham Edelman, New York, N. Y., assignor to The Liquidometer Corporation, Long Island City, N. Y., a corporation of Delaware Application October 6, 1944, Serial No. 557,510

16 Claims. (Cl. 177—351)

This invention relates to improvements in telemetering systems of the electronic type and particularly to improvements in circuit arrangements for the operation of such systems by means of condenser type transmitters.

One of the objects of this invention is to provide a circuit arrangement having a minimum number of component elements.

Another object and feature of the invention is to provide a circuit arrangement which will give direct indications on a suitable indicator and which will also provide for a direct reading of a quantity of a fluid to be measured without the necessity of making any manual setting.

Another object and feature of the invention is to provide a circuit arrangement which can be operated from a low D.-C. supply voltage as may be found in present aircraft practice and which is essentially independent of line voltage variations which would otherwise cause errors in the readings.

Another object and feature of the invention is to provide circuit arrangements which will operate various types of indicating elements such as ratiometer, milliammeters or electronic indicators.

Another object and feature of the invention is to provide an arrangement which does not require any moving elements in the transmitter or a multiplicity of transmitters in tanks where the total height of the fluid cannot be spanned by a single transmitter.

Other and further objects of the invention will appear hereinafter and in the appended claims forming part of the specification.

In the accompanying drawings several embodiments of the invention are shown by way of illustration and not by way of limitation.

Fig. 3 illustrates a second type of circuit also suitable for the operation of a ratiometer type of indicator.

Fig. 4 shows the current relationship in the coils of the ratiometer shown in Fig. 3.

Fig. 5 is a vector diagram showing the action of the ratiometer shown in Fig. 3.

Fig. 6 is another type of electronic circuit suitable for the operation of a ratiometer type of indicator.

Fig. 7 illustrates voltage characteristics of certain elements of the electronic circuit of Fig. 6, and Fig. 8 illustrates the current distribution in the coils of the ratiometer of Fig. 6.

Figure 1:
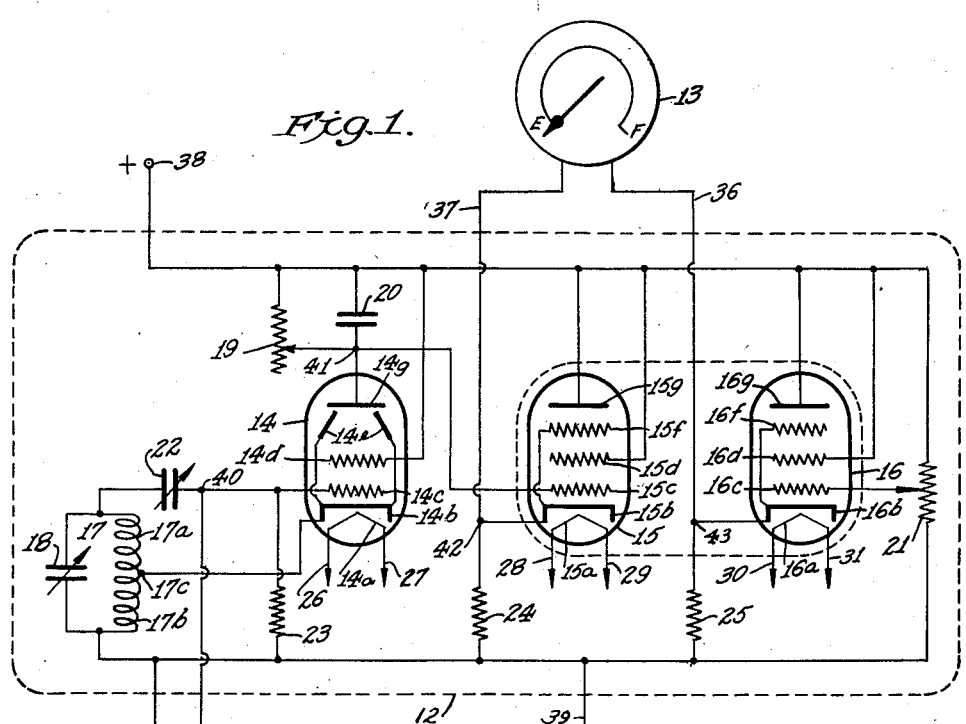
Fig. 1 shows a type of circuit suitable for the operation of a milliammeter type of indicator.

Fig. 1 illustrates a circuit suitable for operating a milliammeter type of indicator. The complete system is composed of three main sections. One of these sections is a transmitter 11 shown as including a condenser unit having an outer electrode 32 and an inner electrode 33. The condenser unit may be placed in a tank or other container filled with a liquid. A capacitance is thus formed inside the tank between the two electrodes 32 and 33. The dielectric material is the liquid, the quantity of which is to be measured and the fluid (which may be air or liquid) that fills the remainder of the tank. It is necessary that the dielectric constants of the two fluids be different from each other so that the changes in the height or level of the junction surface between the two fluids (the two fluids of which at least one must be a liquid must be non-miscible) will cause a corresponding change in the total capacitance between the electrodes. It may be assumed for further discussion that a liquid to be gauged is in the lower portion and air is in the upper portion of the tank and that the dielectric constant of air is 1.00 while the dielectric constant of the liquid the level of which is to be measured is substantially larger than 1.00.

If the liquid to be gauged is a conductor of electricity, then it may be assumed that the two electrodes 32 and 33 are coated with an insulating compound to prevent the flow of a conduction current between the electrodes; and that the apparent dielectric constant would then be for the combination of liquid and insulating compound.

While the system is being described in connection with the measurement of liquid levels, it should be understood that the circuit will indicate any measurable quantity or the position of a member which can be made to cause a change in the capacitance of a condenser. For example, transmitter 11 may be a variable air condenser suitably driven to indicate on a propeller pitch position indicator, flap position instrument, a direction indicator, etc. The second main part of the system is an electronic circuit 12 which will hereinafter be described in detail. An indicator 13 is provided which may be a milliammeter type of instrument calibrated as desired to conform with the changes in capacitance of the condenser element of transmitter 11. The outer electrode 32 and the inner electrode 33 of transmitter 11 are connected to the electronic circuit generally designated 12 through leads 34 and 35.

The indicator 13 is connected to the main circuit through leads 36 and 37.

The electronic circuit comprises essentially an oscillator section and a measuring bridge circuit. In the oscillator section the tank circuit including a condenser 18 and a coil 17 provides an oscillation frequency which need not remain constant during the operation of the device. Coil 17 is tapped at 17c to form two sections 17a and 17b. Tap 17c is connected to cathode 14b of an oscillator tube 14. Across coil 17 (and condenser 18) is also placed a condenser 22 in series with the transmitting condenser 11. Condenser 22 is shown variable, for purposes of adjustment, but is to be assumed to be normally fixed under operating conditions. A point 40, between the condenser 22 and transmitter or condenser unit 11, is connected to a control grid 14c of the tube 14. The plate circuit of the oscillator tube 14 comprises a plate 14g, connected to the positive supply terminal 38 of a source of current through a load resistor 19 and a condenser 20. Resistor 19 is made adjustable since it serves in effect as the sensitivity adjustment of the system. A screen grid 14d is normally connected directly to the positive supply, 38. Beam forming plates 14e may be provided but they are not essential to the operation of the unit as such and depend only on the type of tube used. A grid leak resistor 23 connects the grid 14c to the ground 39. The output voltage appearing across condenser 20 is applied to the bridge section of the circuit, by a connection from a junction 41 to the control grid 15c of a vacuum tube 15. The bridge circuit comprises tubes 15 and 16 cooperating with resistance elements 24 and 25. The arms of the bridge are formed on one side by resistor 24 and the plate resistance between cathode 15b and plate 15g of tube 15 with junction at a point 42. The other side of the bridge is formed by resistor 25 and the plate resistance between cathode 16b and plate 16g of tube 16 with junction at a point 43. The indicating element 13 is connected to points 42 and 43 through leads 37 and 36 respectively. Tubes 15 and 16 are further equipped with screen grids 15d and 16d respectively and suppressor grids 15f and 16f respectively. Potentiometer 21 provides the control grid 16c of tube 16 with a fixed operating potential. This potentiometer, therefore, is a zero adjustment for indicator 13. Heaters 14a, 15a and 16a of tubes 14, 15 and 16 are connected to suitable supplies of current through leads 26 and 27, 28 and 29, and 30 and 31 respectively.

Figure 2:
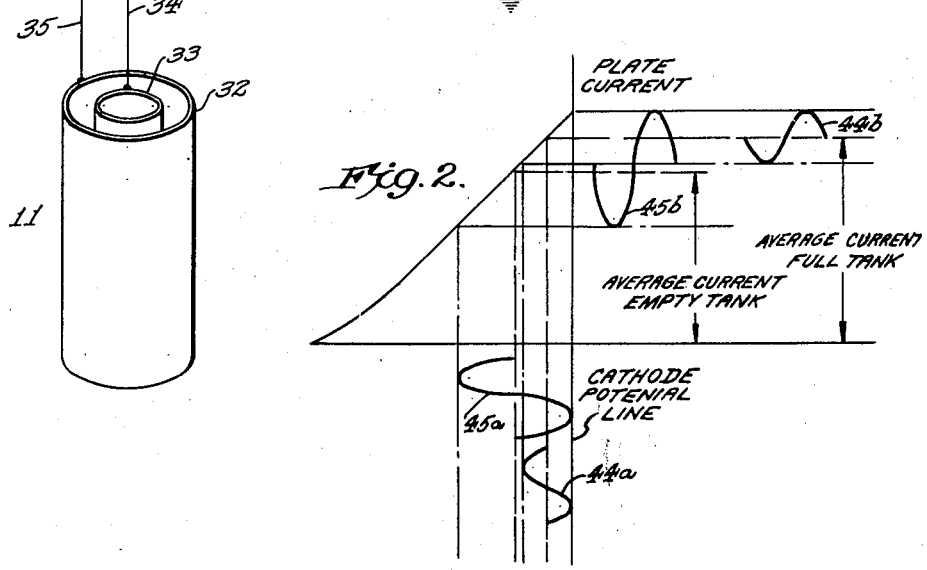
Fig. 2 illustrates the development of plate current in an oscillator tube for the circuit of Fig. 1.

In operation, the transmitting tank unit condenser 11 is connected between ground 39 and junction 40 of the electronic circuit. It is important in many liquid level applications that the outer electrode 32 of condenser 11 be connected to "ground" since this will provide an effective shield for the inner electrode 33. This means that the system will not be materially influenced by external stray fields which would otherwise cause errors in the reading of indicator 13. The inner electrode 33 is connected to an A.-C. potential with respect to ground and is, therefore, the "sensitive" or "detecting" element, the variations in potential of which are the means of determining the liquid level. The oscillating voltage across transmitting condenser 11 is provided by the tank circuit elements 17 and 18. The total voltage appears across coil 17 and is divided between condensers 11 and 22 in a ratio determined by their respective capacitances. Therefore, as the liquid rises between electrodes 32 and 33, the capacitance of condenser 11 is increased, and the voltage across it is decreased. This voltage is the excitation voltage applied to grid 14c of the oscillator tube 14. With less grid excitation, the amplitude of the oscillating voltage across coil 17 diminishes. The D.-C. component of the plate current passes through coil section 17b so that the higher the plate current flow, the higher the average cathode potential. The control of grid 14c depends on the difference in potential between said grid and the cathode 14b, and this is self-adjusted by the grid current so that at all times the control grid will have its positive peak at the approximate cathode potential as shown in Fig. 2. Assuming that the tank is full, the capacitance of condenser 11 will be proportionally large, and the grid excitation small, somewhat as shown by grid signal 44a of Fig. 2. The positive swing of this signal will be up to, or near, the cathode potential line and results in the plate current represented by curve 44b. The average plate current will then be given by the following approximate relationship.

Average plate current = (max. D.-C. current) − (½ A.-C. peak current)

Likewise when the tank is empty, the capacitance of condenser 11 will be smaller and the grid excitation larger as shown by grid signal 45a of Fig. 2. It will here be noticed that the positive grid swing of this signal will also come up to, or near, the cathode potential line, and will result in the plate current represented by curve 45b. The average plate current in this case will be obtained in the same manner as above and results in a lower average plate current as shown in Fig. 2. This plate current is made to pass through resistor 19, Fig. 1 so that it may develop a voltage across this resistor and be filtered by condenser 20. The variations in this voltage are measured by the before mentioned bridge circuit and are indicated on the indicator 13.

The voltage developed across condenser 20, and analyzed above, is impressed on control grid 15c of tube 15 and controls the current through this tube. It has been shown before that if the tank is empty, the D.-C. grid signal to tube 15 will be more positive in potential. This causes the plate current in this tube to increase. Since the plate current also flows through resistor 24, the voltage across this resistor will also increase and unbalance the circuit between points 42 and 43 causing a potential difference to be set up between them. This is measured by indicator 13. It will be noticed that tube 16 is operated at a fixed grid potential determined by the adjustment of potentiometer 21 and is, therefore, used as basis of reference. Potentiometer 21 therefore, can be used as a zero adjustment when the original installation is made.

The circuit shown on Fig. 1, and described above, can be operated directly from a 24 volt or other D.-C. supply. This makes it suitable for aircraft applications, since 24 volt D.-C. is commonly available in aircraft. Operation from a 12 volt supply is possible depending on the design of the vacuum tubes used. The system will also operate from an A.-C. supply if a suitable rectifier is used. The system is essentially independent of line voltage. Due to the properties of the elements in the bridge circuit, a rise or fall in the supply voltage within normal limits found in practice will not seriously affect the readings of the indicator. The two tubes, 15 and 16, have been shown as separate elements, but may, in some cases, be combined in a single envelope without affecting the properties of the electrical circuit. The circuit arrangement provides a stable system which is insensitive to normal variation in frequency and produces a current change through the indicating element which is approximately proportional to the change in capacitance of the transmitting element. Only two leads are required to connect the indicator to the main body of the circuit.

Fig. 3 illustrates another circuit suitable for operating a ratiometer type of indicator. The system is made up of a transmitting element 111 corresponding to unit 11 of Fig. 1 and having an outer electrode 137 and an inner electrode 138 which are connected to the main body of the circuit by leads 139 and 140. The indicator 113 is connected through leads 141, 142, 143, and 144. The electronic circuit 112 is composed essentially of oscillator tube 14 and two double element vacuum tubes, 115 and 116, which constitute a double bridge measuring section. Connections for the oscillator tube 14 are similar to those for the similar tube previously described in connection with Fig. 1, and need not be repeated here. The output voltage across condenser 20 is applied to the control grid 115c of tube 115, and also to the control grid 116c of tube 116. The first bridge circuit is formed by the plate resistance between the cathode 115a and the plate 115i of tube 115 in series with a resistor 132 with junction at a point 117 and by the plate resistance between the second cathode 115b and the second plate 115j of tube 115 in series with a resistor 133 with junction at a point 118. A deflecting coil 145 of indicator 113 is connected across this bridge circuit at points 117 and 118. The second bridge circuit is formed by the plate resistance between cathode 116a and plate 116i of tube 116 in series with a resistor 134 with junction at a point 119 and by the plate resistance between the second cathode 116b and the second plate 116j of the same tube, in series with resistor 135 with junction at a point 120. A second deflecting coil 146 of indicator 113 is connected across this second bridge circuit at points 119 and 120. The resultant field produced by coils 145, 146 cooperates with the magnetic field of a permanent magnet rotor 149. This rotor is normally charged across a diameter and carries a pointer 148 which indicates on a scale 147. Cathodes 115a and 115b of tube 115 are connected together and are "grounded" through a common resistor 124 and lead 101. Likewise, cathodes 116a and 116b are connected together and are "grounded" through a common resistor 125. Control grid 115d of the second section of tube 115 is adjusted by the setting of a potentiometer 122. In a like manner the control grid 116d of the second section of tube 116 is adjusted by the setting of a potentiometer 121. Screen grids 14d of tube 14, 115e and 115f of tube 115, and 116e and 116f of tube 116 are usually connected to the highest available potential. The heaters 14a, 115k and 116k for all tubes are connected to a suitable supply through leads 26 and 27, 128 and 129, and 130 and 131. Tubes 115 and 116 are also equipped with suppressor grids 115g, 115h and 116g, 116h, respectively.

The operation of this circuit will now be described in detail. A signal voltage is developed across condenser 20, and resistor 19, in the same manner as has been described in Fig. 1 for the same oscillator circuit. This is applied to grids 115c and 116c of tubes 115 and 116 respectively, and controls the conductance through those sections of the tube. In a typical application when the tank is full, and a low D.-C. potential is applied to the control grid 115c, the first bridge circuit may be balanced, by adjusting potentiometer 122, so that no difference in potential appears across junctions 117 and 118. No current then will flow in coil 145 as shown by point c on the current curves of Fig. 4. Simultaneously, the same excitation voltage from the output of oscillator tube 14 is applied to control grid 116c. This second bridge circuit, however, is unbalanced by an adjustment of potentiometer 121 so that a potential difference exists between points 119 and 120, and a "negative" current is sent through coil 146. Vector diagram in Fig. 5 shows the angular displacements of the field produced by the coils of indicator 113. Thus, for a grid excitation as shown by a of Fig. 4, there will be no flux in coil 145, and a maximum flux in coil 146 in the direction shown by vector d Fig. 5. When liquid leaves the transmitter 111, the grid 115c goes more positive, and the current to the plate 115i is increased. This current flows through resistor 124, and since this resistor is common to both sections of tube 115, the grid 115d is made more negative with respect to cathode 115b, and the current to plate 115j is decreased. These conditions will unbalance the first bridge circuit so that a potential difference will appear across points 117 and 118 and current will be caused to flow through coil 145 in a "positive" direction as shown by point e of Fig. 4. Simultaneous with this action, the balance of the second bridge circuit will be similarly affected, and the current in coil 146 will change from d to f in Fig. 4. It will become apparent then that for this second position, there will be no flux in coil 146 and a maximum flux in coil 145 in the direction shown by vector e, Fig. 5. The resultant flux, as shown by Fig. 5, therefore, has shifted from position d to e so that the magnetized rotor 149 will follow and thus give on scale 147 an indication of the variable quantity measured by transmitting condenser 111. It will be realized that in Fig. 4, the operating limits of the excitation voltage has been taken from a to b so that the current in coils 145 and 146 will flow in one direction only, but the arrangement permits, if desired, a reversal of current in each coil. However, for greater linearity, the operating points have been taken as indicated.

The circuit shown on Fig. 3 and described above, can be operated directly from a 24 volt or other D.-C. supply, or from an A.-C. supply through a rectifier. The system may be made to operate various types of ratiometers including a moving coil type of ratiometer. The scale characteristics for this system are essentially linear in relation to the change of capacitance in the transmitter and are also dependent on the individual characteristics of the ratiometer itself. As previously mentioned, the flow of current in coils 145 and 146 are not limited to a single direction, but may be reversed depending on the selected operating points. This is apparent from the nature of the bridge circuit and also from the current distribution curves of Fig. 4. Like the other circuits, the system is insensitive to normal variations in frequency. Four leads are required to connect the indicator to the main body of the circuit.

Fig. 6 illustrates another circuit variation suitable for the operation of a ratiometer indicator, A condenser 200 which corresponds to condenser unit 11 of Fig. 1 represents the variable to be measured, and indicated by a pointer 231 on scale 232 of a ratiometer 203. A pointer 231 is supported by a rotor 230 magnetized across a diameter. Condenser 200 and ratiometer 203 are connected to the electronic circuit 201 through leads 223 and 224, and 225, 226 and 227 respectively. The electronic circuit consists essentially of an oscillator circuit including tube 204 with a plate supply resistor 219 and a filter condenser 218 and a measuring circuit, the main elements of which are tubes 205 and 206. The oscillator section is essentially the same as that of the previous circuits with the exception that an oscillating current is drawn off by an auxiliary plate 204c of vacuum tube 204 and this current is passed through a resistor 211, and filtered by a condenser 210 thus developing a D.-C. voltage across resistor 211. A selected part of this voltage is applied to the control grid 205c of tube 205. Vacuum tubes 205 and 206 are double section tubes. Cathodes 205a and 205b are connected together and are grounded through a common resistor 212, and a lead 222. The two sections of tube 205, and resistors 216 and 217 form a bridge circuit. This bridge circuit consists, on one side, of the plate resistance between cathode 205a and plate 205i in series with a resistor 217 with junction at a point 234. The other side of the bridge is formed by plate resistance between cathode 205b and plate 205j in series with a resistor 216 with junction at a point 235. Resistors 216 and 217 are not necessarily equal. The potentials appearing at points 234 and 235 are applied to control grids 206c and 206d respectively of tube 206. The plate voltage for tube 205 is obtained from a point 214 of a voltage divider 213—215 and is approximately one-half of the supplied voltage applied to terminal 221. The operating point of control grid 205d is controlled by the position of potentiometer 213. The cathodes 206a and 206b of tube 206 are connected together to point 214 of the voltage divider. Plate 206i is connected to one side of ratiometer coil 228, while plate 206j is connected to one side of ratiometer coil 229. The opposite sides of these coils are joined through a lead 233 and connected to the positive supply by a connecting lead 226. Screen grids 205e, 205f, 206e and 206f are connected to the highest available D.-C. supply. Tube 204 is equipped with a suppressor grid 204h and tubes 205 and 206 are equipped with beam forming plates 205g, 205h and 206g, 206h respectively. Heaters 204a, 205k and 206k are connected to suitable voltage supply.

In operation, a selected proportional part of the D.-C. voltage developed across resistor 211 is applied to control grid 205c of tube 205. With transmitting condenser 200 at its least capacitance, the signal voltage applied to grid 205c will be most negative thus holding back the plate current flowing to plate 205i and resistor 217. The voltage across resistor 217, therefore, will be relatively small as shown by point c on line a of Fig. 7, and the potential of junction 234 will be relatively high. For this condition of the transmitting condenser, the control grid 205d of the second section of tube 205 is adjusted so that maximum plate current will flow to plate 205j and through resistor 216. Since this current is proportionally high, a greater voltage will appear across resistor 216, of the order shown by point d on line a of Fig. 7, and the potential of junction 235 will be relatively low. Under this condition, junction 234 will be positive with respect to junction 235. The potential at junction 234 is applied to the control grid 206c of the tube 206, while the potential of junction 235 is applied to the control grid 206d of the same tube. Since control grid 206c is more positive than grid 206d, the plate current to plate 206i (see Fig. 8 point h) and hence to coil 228, will be greater than that to plate 206j (see Fig. 8 point g) and to coil 229. Rotor 230 will, therefore, be controlled mainly by the magnetic flux from coil 228. If now, the potential applied to control grid 205c is made less negative, the current to plate 205i will be increased. This plate current flows through resistor 212 which is common to both sections of tube 205. Since the current through resistor 212 increases, the voltage across resistor 212 increases, making grid 205d more negative in relation to cathode 205b. This in turn decreases the current to plate 205j and resistor 216. The voltage across resistor 217, therefore, increases as the voltage across resistor 216 decreases until a point such as f, Fig. 7, is reached where the two voltages are equal. This point indicates that the bridge circuit is balanced and that no potential difference exists between points 234 and 235. The voltages applied to control grids 206c and 206d, therefore, are equal, so that the plate currents to plates 206i and 206j (and hence coils 228 and 229) are also equal as shown at j of Fig. 8. Under this condition, the rotor 230 will be equally controlled by both deflecting coils, and the pointer 231 will indicate approximately center. If the signal voltage to control grid 205c is made still more positive, the voltage across resistor 217 is further increased while that across resistor 216 is further decreased. By similar reasoning as in the previous cases, the coil currents will increase through coil 229 and decrease through coil 228 so that the control of rotor 230 will now be assumed mainly by coil 229 and hence the indicator will read at the other end of the scale.

The circuit shown on Fig. 6, and described above can be operated directly from a 24 volt or other D.-C. supply or from an A.-C. supply through a rectifier. The system can be made to operate various types of ratiometer indicators, and as in the other cases is essentially independent of line voltage variations. The currents flowing through the deflecting coils of the indicating element are limited to a single direction. Three leads are required to connect the indicator to the main body of the circuit.

While the above circuits have been shown to operate milliammeters and ratiometers, it is also possible to reproduce suitable indications on the screen of a cathode ray type of tube. For this purpose, a suitably high operating voltage must be available. Likewise, so-called "magic-eye" tubes may be also used. However, for these tubes, the total scale deflection will be somewhat limited. It is also to be understood that the circuits described herein can be operated with a number of different variations without departing from the spirit for which they were developed.

What is claimed is:

1. A system for indicating the magnitude of a physical condition, comprising a variable capacitor having a capacitance which is varied with variation of the magnitude of said physical condition, an electronic tube including a cathode, a control grid and a plate, a connection from said capacitor to said control grid, an oscillatory circuit including said capacitor, said control grid and said cathode for controlling the amplitude of oscillation in said electronic tube, circuit means coupled to said electronic tube and responsive to the amplitude of oscillation thereof for providing a direct current potential difference across a resistor, the value of which potential difference is a function of the capacitance of said variable capacitor, electronic bridge means including at least one electronic tube and having at least two electronic space paths forming two similar arms of a bridge, a connection from said circuit means such that said direct current potential difference will be effective to control current flow in one of said two electronic space paths of the bridge, a predetermined direct current potential similarly controlling current flow in the other of said two electronic space paths of the bridge, and an electric measuring instrument connected to said bridge means, so as to be affected in its indication by unbalance thereof, for indicating the magnitude of said condition throughout a predetermined range of variation of said magnitude.

2. A system for indicating the magnitude of a physical condition in accordance with claim 1, wherein said oscillatory circuit includes a parallel connected inductance and capacitor, and two capacitors shunted across said inductance, one of said two shunted capacitors being said variable capacitor, the capacitance of which is varied with a variation of the magnitude of said physical condition, and the other of said two shunted capacitors being manually adjustable; and an electrical connection to the control grid of said electronic tube from the common connection between said two shunted capacitors.

3. A system for indicating the magnitude of a physical condition, comprising a variable capacitor having a capacitance which is varied with variation of the magnitude of said physical condition, an electronic tube including a cathode, a control grid and a plate, a connection from said capacitor to said control grid, an oscillatory circuit including said capacitor, said control grid and said cathode for controlling the amplitude of the oscillation in said electronic tube, circuit means including said electronic tube and responsive to the amplitude of oscillation thereof for providing a direct current potential difference across a resistor, the value of which potential difference is a function of the capacitance of said variable capacitor, a direct current energized electronic bridge including a second electronic tube providing an electronic space path forming one arm of said bridge, a connection from said circuit means such that said direct current potential difference will be effective to control current flow in said space path of the bridge, and a milliammeter type electric indicating instrument connected across the output of said bridge and responsive to the unbalance thereof for indicating the magnitude of said condition throughout a predetermined range of variation of said magnitude.

4. A system for indicating the magnitude of a physical condition in accordance with claim 3, wherein said direct current energized electronic bridge includes two similar electronic tubes, one of which provides said electronic space path having a current flow therethrough which is controlled by said potential difference, and the other of said tubes in said bridge having a control grid maintained at a predetermined, manually adjustable potential.

5. A system for indicating the magnitude of a physical condition, comprising a variable capacitor having a capacitance which is varied with variation of the magnitude of said physical condition, an electronic tube including a cathode, a control grid and a plate, a connection from said capacitor to said control grid, an oscillatory circuit including said capacitor, said control grid and said cathode for controlling the amplitude of oscillation in said electronic tube and thereby for controlling the plate current flowing therethrough, a resistor through which said plate current passes, an adjustable tap from said resistor providing a manually variable direct current potential difference across at least a part of said resistor which will be automatically proportioned to the magnitude of said condition for any predetermined manual setting of said tap, a direct current energized electronic bridge including a second electronic tube providing an electronic space path forming one arm of said bridge, a connection from said circuit means such that said direct current potential difference will be effective to control current flow in said space path of the bridge, and a milliammeter type electric indicating instrument connected across the output of said bridge and responsive to the unbalance thereof for indicating the magnitude of said condition throughout a predetermined range of variation of said magnitude.

6. A system for indicating the magnitude of a physical condition in accordance with claim 5, wherein said electronic bridge includes two similar electronic tubes making up two of its arms, one of said two electronic tubes providing said electronic space path, current flow through which is controlled by said direct current potential difference derived from said oscillatory circuit, and the other of said two electronic tubes of said bridge providing an electronic space path, current flow through which is controlled by a direct current potential determined by the manual adjustment of a potentiometer.

7. A system for indicating the magnitude of a physical condition, comprising electric circuit means providing a direct current potential difference across a resistor, the value of which potential difference is a function of the magnitude of said physical condition, electronic bridge means including at least one electronic tube and having at least two electronic space paths forming two similar arms of a bridge, a connection from said circuit means such that said potential difference will be effective to control current flow in one of said two electronic space paths of the bridge, a predetermined direct current potential similarly controlling current flow in the other of said two electronic space paths of the bridge, and an electric indicating instrument, including two coils connected to be differentially energized in accordance with the unbalance of said bridge means, said instrument including a rotor, the position of which is determined by the differential energization of said coils, and the position of said rotor indicating the magnitude of said condition throughout a predetermined range of variation thereof.

8. A system for indicating the magnitude of a physical condition in accordance with claim 7, wherein said coils of said indicating instrument are stationary deflecting coils cooperating with a transversely magnetized rotor of said instrument and controlling the position of said rotor by the direction of the resultant magnetic flux of said coils.

9. A system for indicating the magnitude of a physical condition, comprising a variable capacitor having a capacitance which is varied with variation of the magnitude of said physical condition, an electronic tube including a cathode, a control grid and a plate, a connection from said capacitor to said control grid, an oscillatory circuit including said capacitor, said control grid and said cathode for controlling the amplitude of oscillation in said electronic tube, circuit means coupled to said electronic tube and responsive to the amplitude of oscillation thereof for providing a direct current potential difference across a resistor, the value of which potential difference is a function of the capacitance of said variable capacitor, electronic bridge means including at least one electronic tube and having at least two electronic space paths forming two similar arms of a bridge, a connection from said circuit means such that said potential difference will be effective to control current flow in one of said two electronic space paths of the bridge, a predetermined direct current potential similarly controlling current flow in the other of said two electronic space paths of the bridge, and an electric indicating instrument, including two coils connected to be differentially energized in accordance with the unbalance of said bridge means, said instrument including a rotor, the position of which is determined by the differential energization of said coils, and the position of said rotor indicating the magnitude of said condition throughout a predetermined range of variation of said magnitude.

10. A system for indicating the magnitude of a physical condition, comprising an electric circuit means providing a direct current potential difference across a resistor, the value of which is a function of the magnitude of said physical condition, two electronic bridges, two arms of each of said bridges each comprising an electronic space path, one electronic space path of each bridge having its current flow controlled by said direct current potential difference and the other of the two electronic space paths of each bridge having its current flow controlled by a predetermined direct current potential, said predetermined direct current potentials for the two bridges being substantially different from one another so that the unbalance currents of said two bridges for any value of the first named direct current potential difference will be substantially different, and an electric indicating instrument including two coils connected to said bridges respectively, so as to be differentially energized in accordance with the unbalance currents of said bridges respectively, said instrument including a rotor, the position of which is determined by the differential energization of said coils and the position of which is indicative of the magnitude of said condition throughout a predetermined range of variation of said magnitude.

11. A system for indicating the magnitude of a physical condition in accordance with claim 10, wherein said electric measuring instrument is a ratiometer type instrument having two stationary deflecting coils coacting with a permanently magnetized rotor, so as to control the position of said rotor by the resultant direction of the flux of said coils for indicating the magnitude of said condition throughout a predetermined range of variation of said magnitude.

12. A system for indicating the magnitude of a physical condition in accordance with claim 10, comprising in addition, means for manually adjustably predetermining the current flow in the second named arm of each bridge for comparison with the arm including said electronic space path in each bridge, so as to control the relation of the unbalance currents of said two bridges in respect to one another and in turn to control the sensitivity of the indication obtained from said instrument.

13. A system for indicating the magnitude of a physical condition, comprising electric circuit means for providing a direct current potential difference across a resistor, the value of which potential difference is a function of the magnitude of said physical condition, a bridge having two output terminals and including at least one electronic space path, current flow through which path is controlled by said direct current potential difference, for establishing two potentials at the output terminals of the bridge, the unbalance of which two potentials being a function of said magnitude, means providing a pair of similar electronic space paths, current flow through which is controlled by said two potentials respectively, an electrical indicating instrument including a rotor and at least two coils adapted to be differentially energized, the position of said rotor being determined by the relative energization of said coils, and electric circuit means for causing currents flowing in said pair of electronic space paths to flow through said coils respectively, whereby said rotor will indicate by its position the magnitude of said condition throughout a predetermined range of variation of said magnitude.

14. A system for indicating the magnitude of a physical condition in accordance with claim 13, wherein said bridge includes two similar electronic space paths, current flow through one of which is controlled by said direct current potential difference and current flow through the other of which is controlled by a predetermined manually variable potential.

15. A system for indicating the magnitude of a physical condition in accordance with claim 13, wherein said bridge is made up of two similar electronic space paths and two similar fixed resistances, current flow through one of said space paths being controlled by said direct current potential difference as aforesaid, and current flow through the other of said space paths being controlled by a predetermined direct current potential manually adjustable by the setting of a potentiometer; and wherein said electrical indicating instrument is a ratiometer type instrument including two stationary deflecting coils and a permanently magnetized rotor, the position of which rotor is controlled by the direction of the resultant magnetic flux of said coils.

16. A system for indicating the magnitude of a physical condition, comprising a variable capacitor having a capacitance which is varied with variation of the magnitude of said physical condition, an electronic tube including a cathode, a control grid and a plate, a connection from said capacitor to said control grid, an oscillatory circuit including a source of direct current, said capacitor, said control grid and said cathode for controlling the amplitude of oscillation in said electronic tube, a diode plate adjacent to said cathode in said tube and connected to one terminal of the direct current source which provides the direct current component of the plate current for said tube through a potentiometer resistance, for providing a manually variable direct current potential difference across at least a part of said potentiometer resistance which is a function of the magnitude of said condition, a bridge having two output terminals and including at least one electronic space path, current flow through which path is controlled by said direct current potential difference, for establishing two potentials at the output terminals of the bridge, the unbalance of which two potentials being a function of said magnitude, means providing a pair of similar electronic space paths, current flow through which is controlled by said two potentials respectively, an electrical indicating instrument including a rotor and at least two coils adapted to be differentially energized, the position of said rotor being determined by the relative energization of said coils, and electric circuit means for causing currents flowing in said pair of electronic space paths to flow through said coils respectively, whereby said rotor will indicate by its position the magnitude of said condition throughout a predetermined range of variation of said magnitude.

ABRAHAM EDELMAN.

REFERENCES CITED

The following references are of record in the file of this patent:

UNITED STATES PATENTS

| Number | Name | Date |
|---|---|---|
| 1,694,237 | Simonds | Dec. 4, 1928 |
| 1,842,968 | Howath | Jan. 26, 1932 |
| 2,011,315 | Gilbert | Aug. 13, 1935 |
| 2,076,944 | Howe | Apr. 13, 1937 |
| 2,280,678 | Waymouth | Apr. 21, 1942 |

FOREIGN PATENTS

| Number | Country | Date |
|---|---|---|
| 398,065 | Great Britain | Sept. 7, 1933 |